United States Patent [19]
Ishida et al.

[11] Patent Number: 6,027,124
[45] Date of Patent: Feb. 22, 2000

[54] METAL GASKET

[75] Inventors: Kenji Ishida; Yutaka Furuta, both of Osaka, Japan

[73] Assignee: Nippon Gasket Co., Ltd., Osaka-fu, Japan

[21] Appl. No.: 08/989,417

[22] Filed: Dec. 12, 1997

[30] Foreign Application Priority Data

Dec. 20, 1996 [JP] Japan ..................................... 8-354748

[51] Int. Cl.$^7$ ..................................................... F16J 15/00
[52] U.S. Cl. ........................... 277/595; 277/598; 277/594
[58] Field of Search ..................................... 277/592, 593, 277/594, 595, 598, 600, 601

[56] References Cited

U.S. PATENT DOCUMENTS

| | | | |
|---|---|---|---|
| 4,325,559 | 4/1982 | Czernik et al. | 277/592 |
| 4,331,336 | 5/1982 | Czernik et al. | 277/592 |
| 4,728,110 | 3/1988 | Nakasone | 277/595 |
| 5,286,039 | 2/1994 | Kawaguchi et al. | 277/593 |
| 5,348,311 | 9/1994 | Miyaoh | 277/598 |
| 5,393,076 | 2/1995 | Hagiwara et al. | 277/592 |
| 5,482,298 | 1/1996 | Udagawa | 277/600 |
| 5,560,623 | 10/1996 | Yoshino | 277/595 |
| 5,639,101 | 6/1997 | Tanaka et al. | 277/593 |
| 5,690,343 | 11/1997 | Takada et al. | 277/595 |
| 5,755,447 | 5/1998 | Hagiwara et al. | 277/601 |
| 5,769,430 | 6/1998 | Udagawa | 277/592 |

FOREIGN PATENT DOCUMENTS

| | | |
|---|---|---|
| 4-039467 | 4/1992 | Japan . |
| 8-233105 | 9/1996 | Japan . |

*Primary Examiner*—Anthony Knight
*Assistant Examiner*—Mark Williams
*Attorney, Agent, or Firm*—Browdy and Neimark

[57] ABSTRACT

A metal gasket in which a thin metal plate for reinforcing the beads of an elastic metal plate is laminated on bead regions only of the elastic metal plate, whereby a stable sealing performance is secured for a long period of time. This metal gasket comprises a thin metal plate provided with beads extending around the circumferences of parallel arranged combustion chamber holes, and an elastic metal plate having combustion chamber holes and extending with a predetermined width and laminated on the portions of the thin metal plate which are around the combustion chamber holes so as to be opposed to valley portions of the beads. The thickness of the thin metal plate is set smaller than that of the elastic metal plate. The thin metal plate is fixed to the elastic metal plate with locking portions formed at the outer circumference of the former engaged with slits formed in the regions of the latter which are on the outer sides of the beads, the thin metal plate being combined with the elastic metal plate at joint portions thereof by spot welding or laser welding.

4 Claims, 3 Drawing Sheets

METAL GASKET

BACKGROUND OF THE INVENTION

1. Field of the Invention

This invention relates to a metal gasket interposed between the opposed surfaces of parts of a multicylinder engine, and adapted to seal a clearance between these parts.

2. Description of the Prior Art

In order to seal a clearance between a cylinder head and a cylinder block of an engine, a gasket made of a metallic material has been used. In a recent engine, the increasing of an output and the reduction of the weight have been demanded, and, in order to meet the demand, a cylinder head and a cylinder block, or a cylinder head alone tends to be made of an aluminum material of a low specific gravity instead of conventionally used steel and casting of a high specific gravity.

An aluminum cylinder head and an aluminum cylinder block, structural members of an engine have a small weight but a low rigidity, so that a relative displacement tends to increase between these structural members during an operation of the engine. Various kinds of metal gaskets are inserted between the two structural members so as to seal a clearance between the opposed fixing surfaces thereof. Especially, a distance between cylinder bores has become shorter in accordance with a decrease in the weight of an engine, and a distance between combustion chamber bore holes of a metal gasket has also become shorter in accordance with such narrow regions between the cylinder bores. Therefore, it is demanded that a predetermined level of sealing performance of the metal gasket be secured by forming beads on the corresponding narrow regions of the metal gasket.

A metal gasket is provided with beads on the portions thereof which are close to the circumferences of through holes thereof which correspond to cylinder bores, i.e. combustion chambers and passages for water and oil, in such a manner that, when a cylinder head and a cylinder block are fixed to each other by tightening the same by bolts, the beads form elastic annular contact portions with respect to the opposed surfaces of these engine-forming members and seal a clearance therebetween.

In an engine provided with a cylinder head gasket, a clearance between a cylinder head and a cylinder block increases and decreases repeatedly during a combustion cycle of the engine, and stress, i.e. mechanical stress and thermal stress are exerted repeatedly on the metal gasket. The load fluctuation stress on an engine occurs greatly in the portions of a cylinder block and a cylinder head which have the lowest rigidity, and, especially, bead portions between combustion bore holes receive an extremely heavy load. Consequently, permanent set in fatigue and cracks occur in the beads, and the sealing performance of the metal gasket is deteriorated.

The conventional cylinder head gaskets include the cylinder head gasket 1 disclosed in Japanese Patent Laid-Open No. 233105/1996. This cylinder head gasket 1 is applied to an open deck, and comprises a metal plate of a larger thickness forming the portions of the gasket 1 which are on the inner side of a water jacket 12 and around the circumferences of cylinder bore holes 2, and a metal plate of a smaller thickness forming the portions of the gasket 1 which are other than these circumferential portions 14 of the cylinder bore holes 2 and the portions 15 to be superposed on the thicker metal plate, these two metal plates 14–15 being superposed on each other, the superposed portions 15a being then welded.

The cylinder head gasket 1 disclosed in this publication is formed of divided metal plates 14–15 constituting a cylinder bore hole 2 surrounding portion 14 and the remaining portion 15 respectively, and the two metal plates 14–15 are welded at a water hole 12 surrounding portion. Therefore, the portions 14–15 to be welded of the metal plates are superposed on each other to cause the thickness of the welded portion 15 a to increase extremely as compared with that of the remaining portion 15. This cylinder head gasket 1 can be applied to an open deck in which a water groove 12 is provided in a water jacket in the opposed surfaces of the cylinder block 11 and cylinder head 13 but it is impossible to insert this gasket 1 directly between the opposed surfaces of other type of cylinder head 13 and cylinder block 11 and bring the same into contact with these opposed surfaces.

There is another metal cylinder head gasket 1 disclosed in Japanese Utility Model Laid-Open No. 39467/1992. This metal cylinder head gasket 1 comprises an elastic metal plate provided with cylinder bore holes 2.2A~2D, half beads 5.5A.5B extending along the circumferences of these cylinder bore holes, and beads 4.4A~4D extending along the half beads 5.5A.5B, and wire rings 6.6A.6B the flat surfaces of which are fixed to annular surfaces formed between the beads 4.4A~4D and half beads 5.5A.5B on the elastic metal plate. This metal cylinder head gasket 1 is formed with flat wire rings 6.6A.6B provided around the cylinder bore holes 2.2A~2D Since one wire ring 6.6A.6B is provided around each cylinder bore hole 2.2A~2D, the portions between adjacent cylinder bore holes 2.2A~2D are necessarily set to a width equal to the sum of that of a bead 4 and that of two wire rings 6. However, the weight of a recent engine has further been reduced, and a distance between cylinder bores has become shorter, so that it is difficult to provide two wire rings 6 between adjacent cylinder bore holes 2. Moreover, fixing wire rings on an elastic metal plate of a gasket causes the stability of the gasket to lower. Since the wire rings 6 require to have a predetermined thickness with the width of the regions between the cylinder bore holes 2 set small, this structure has the difficulty in using a fixing means, such as a welding means for securing the wire rings to the elastic metal plate.

When impressions occur in the surfaces of a cylinder head and a cylinder block 11 or when irregularity occurs between the opposed surfaces thereof, a large strain occurs in, especially, the regions between combustion chamber bores, and a high-temperatures, high-pressure combustion gas enters a space between the portions of the opposed fixing surfaces which have a large strain to cause the beads 4.4A~4D on the elastic metal plate to be corroded and polluted, permanent set in fatigue and cracks to occur in the beads 4.4A~4D, and the sealing performance of the gasket 1 to lower.

SUMMARY OF THE INVENTION

An object of the present invention is to provide a metal gasket formed by disposing on the regions of an elastic metal plate which are around combustion chamber holes a metal plate the thickness of which is smaller than that of the elastic metal plate, so as to reinforce the beads on the elastic metal plate, eliminate the irregularity of a deck surface of a cylinder head which occurs around cylinder bores of a conventional metal gasket, improve the sealability of the metal gasket, restrict a full compression of the beads, i.e. the quantity of deformation of the beads, reduce the stress on the beads and improve the durability of the metal gasket, and by increasing the thickness of the portions of the elastic metal plate which are around the cylinder bores by a level corresponding to the thickness of the thin metal plate and setting the thickness of the other portions around water holes and oil holes to a lower level to secure surface pressure balance of the gasket as a whole and improve the sealing reliability and durability of the metal gasket.

This invention relates to a metal gasket comprising an elastic metal plate having beads along the circumferences of parallel-arranged first combustion chamber holes, and a thin metal plate which has second combustion chamber holes opposed to the first combustion chamber holes, and which extend with a predetermined width around the second combustion chamber holes so as to be opposed to valley portions of the mentioned beads.

The thickness of the thin metal plate is set smaller than that of the elastic metal plate, for example, around ½ of the thickness of the elastic metal plate.

The thin metal plate is joined to the elastic metal plate by spot welding or laser welding. In another embodiment, the thin metal plate is joined to the elastic metal plate with a bonding agent.

The thin metal plate has outwardly projecting locking portions at an outer circumference thereof, and the elastic metal plate slits in the regions thereof which are on the outer side of the beads thereon, the thin metal plate being fixed to the elastic metal plate with the locking portions of the former engaged with the slits in the latter. The thin metal plate is joined to the elastic metal plate by spot welding or laser welding in the regions thereof which are on the side of the combustion chamber holes with respect to the beads of the elastic metal plate.

The thin metal plate is provided with beads having ridge portions aligned and engaged with the valley portions of the beads on the elastic metal plate.

In this metal gasket, another elastic metal plate having beads engageable with the ridges of the beads on the previously-mentioned elastic metal plate is laminated on the latter elastic metal plate.

In this metal gasket, a thin metal plate is laminated on the regions only of an elastic metal plate which are around the combustion chamber holes. Accordingly, when the gasket is interposed between a cylinder head and a cylinder block 11 and then tightened, a surface pressure occurring around cylinder bores, i.e., around combustion chamber holes becomes higher than that occurring in the other portion, and the sealing performance of the gasket is improved. Namely, since a total thickness of the regions of the plates which are around the cylinder bores and that of the other regions thereof, i.e. the regions around holes, such as oil holes and water holes are different, the balance of surface pressure of the gasket as a whole is improved, and the sealing performance of the gasket as a whole is also improved. The thin metal plate is made thinner than the elastic metal plate, and fused to the latter plate by spot welding or laser welding, or by engaging the locking portions of the thin metal plate with the slits formed in the elastic metal plate. Therefore, the thickness of the welded portions does not specially increase as compared with that of the welded portions of a gasket wherein two plates are laminated and welded, so that the metal gasket according to the present invention can be applied to various types of engines. Moreover, the thin metal plate constitutes a compensating member having the function of a stopper for preventing a full compression of the beads of the elastic metal plate. This enables the occurrence of permanent set in fatigue of and cracks in the beads to be prevented, the durability of the beads to be improved, and a reliable sealing performance to be secured for a long period of time.

In the metal gasket according to the present invention, a thin metal plate is fixed by welding to the bead regions around combustion chamber holes of an elastic metal plate as mentioned above. Therefore, the thickness of the portions of the plates which are in the regions around the combustion chamber holes becomes larger than that of the other portions thereof which are in the regions around holes, such as water holes and oil holes by the thickness of the thin metal plate. Consequently, the surface pressure of the metal plates around the combustion chamber holes the temperature of which becomes high increases, and the entire surface pressure balance is improved. This enables the general sealing performance of the metal gasket to be improved.

In this metal gasket, laminating and fixing together by welding elastic metal plates are not done, so that the welding of the thin metal plate to the elastic metal plate does not cause the thickness of the combined metal plates to increase extremely. Accordingly, this metal gasket can be applied to various types of engines. Since the thin metal plate has a reinforcing effect for the beads of the elastic metal plate, the durability of the beads can be improved, and a reliable sealing performance can be displayed. Moreover, this metal gasket is simply constructed, and can be easily manufactured, so that the manufacturing cost can be reduced.

DETAILED DESCRIPTION OF THE EMBODIMENTS

The embodiments of the metal gasket according to the present invention will now be described with reference to the drawings. This metal gasket is preferably used as a cylinder head gasket held (not shown) between a cylinder head and a cylinder block and sealing a clearance between the opposed surfaces thereof. This metal gasket is provided with parallel-arranged combustion chamber holes, i.e. holes correspondingly to cylinder bores formed in the cylinder block. In this metal gasket a plurality of, combustion chamber holes are formed in parallel correspondingly to the cylinder bores so that the metal gasket can be applied to a multi-cylinder engine, such as a 4-cylinder engine and a 6-cylinder engine.

Figure 1:
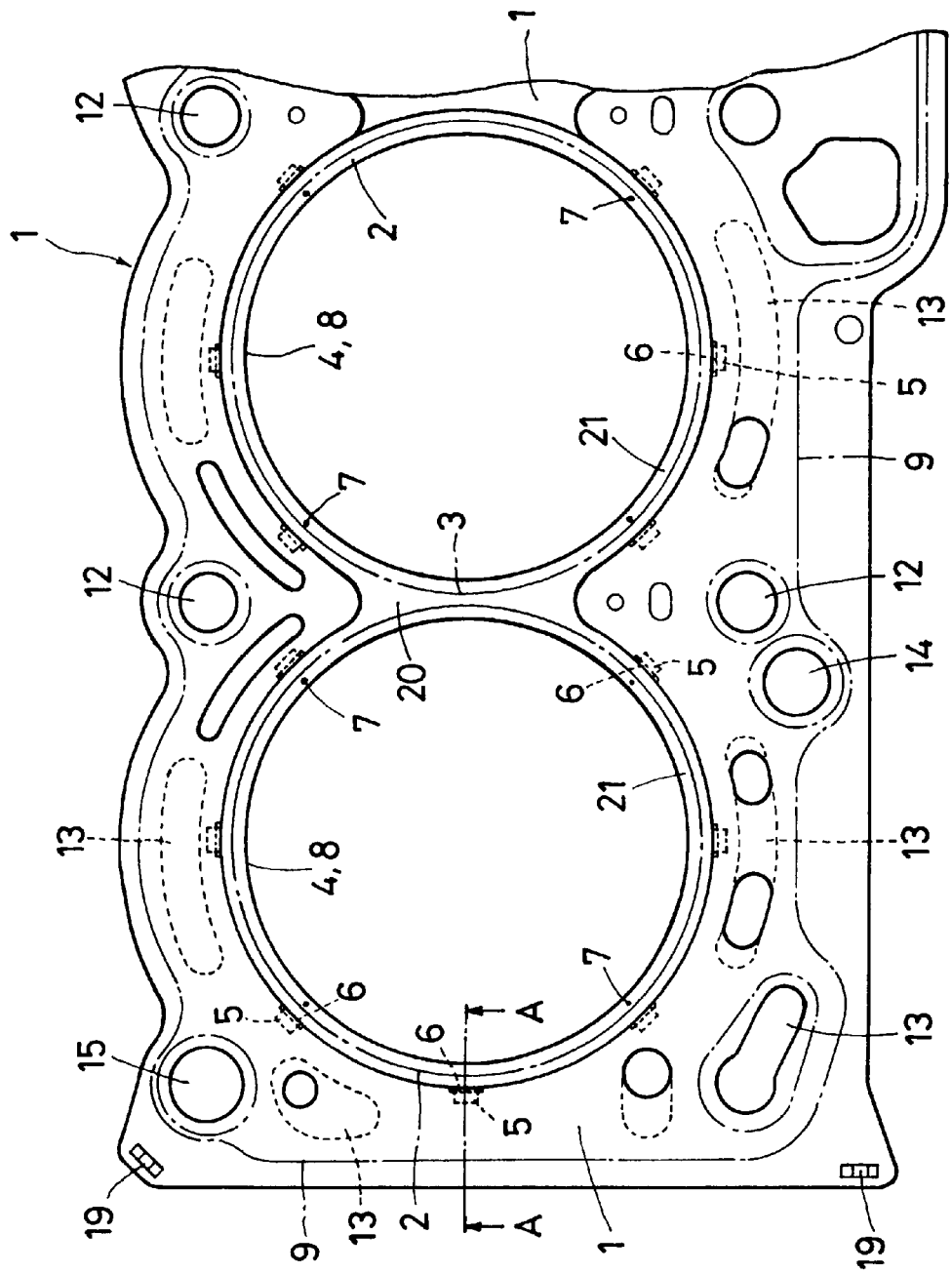
FIG. 1 is a partial plan view showing a first embodiment of the metal gasket according to the present invention.
Figure 2:
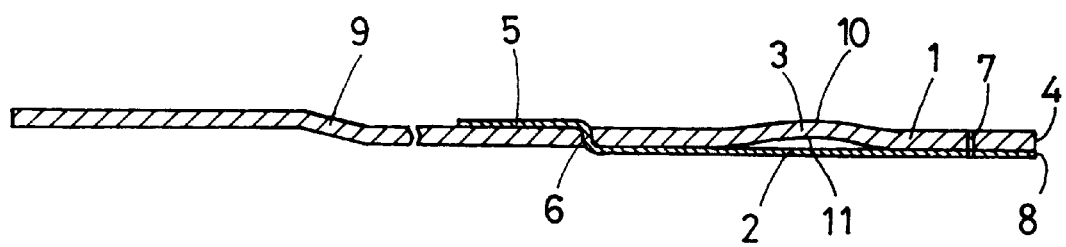
FIG. 2 an enlarged sectional view of the first embodiment taken along the line A—A in FIG. 1.

A first embodiment of the metal gasket according to the present invention will now be described with reference to FIGS. 1 and 2.

This metal gasket comprises an elastic metal plate 1 provided with combustion chamber holes 4 formed correspondingly to cylinder bores made in parallel in a multi-cylinder engine, and a thin metal plate 2 which has combustion chamber holes 8 formed in alignment with to the combustion chamber holes 4 of the elastic metal plate 1, and which is laminated on the regions of these combustion chamber holes of the plate 1. The elastic metal plate 1 is provided with bolt holes 12, water holes 13, oil holes 14 and knock holes 15 around the combustion chamber holes 4. The elastic metal plate 1 is also provided around the circumferences of the combustion chamber holes therein with cross-sectionally convex beads 3. The elastic metal plate 1 is further provided with a half bead 9 along an outer circumference thereof, and marks 19 representing the type of the gasket and used as positioning marks. The thin metal plate 2 is provided with combustion chamber holes 8 in alignment with those 4 formed in the elastic metal plate 1, and fulfils the function of a thin auxiliary plate with respect to the elastic metal plate 1.

This metal gasket comprises, especially, the elastic metal plate 1 provided with beads 3 formed along the circumferences of the combustion chamber holes 4, and the thin metal plate 2 having regions of a predetermined width around the combustion chamber holes 8 along to the beads 3 of the elastic metal plate 1, these regions being formed so as to be opposed to valley portions 11 of the beads 3. Any adjacent regions 21 around the combustion chamber holes 8 are merged with each other at regions 20. The thin metal plate 2 is provided at an outer circumference thereof with 6–10 outwardly projecting tongue-shaped locking portions 5 per combustion chamber hole 8, while the elastic metal plate 1 is provided at the portions of regions thereof on the outer side of the beads 3 which are opposed to the locking portions 5 with such slits 6 that permit the locking portions 5 to be inserted thereinto. The combining of the thin metal plate 2 with the elastic metal plate 1 is attained by engaging the locking portions 5 of the thin metal plate 2 with the slits 6 of the elastic metal plate 1, and bending the locking portions along the surface of the elastic metal plate 1. In the regions of the beads 3 of the elastic metal plate 1 which are on the side of the combustion chamber holes 4, the thin metal plate 2 is combined with the elastic metal plate 1 at joint portions 7 in a plurality of (four in the embodiment of FIG. 1) positions by spot welding or laser welding.

In this metal gasket, for example, the elastic metal plate 1 is formed out of SUS301, and the thin metal plate 2 SUS304. The thickness of the thin metal plate 2 is smaller than that of the elastic metal plate 1. For example, the thickness of the elastic metal plate 1 is set to around 0.2–0.3 mm, and the thickness of the thin metal plate 2 around 0.1–0.15 mm, a half of the thickness of the elastic metal plate 1.

When the thin metal plate 2 and elastic metal plate 1 in this metal gasket are disposed on the side of a cylinder head and on the side of a cylinder block respectively with the material of each member (cylinder head of an aluminum alloy and cylinder block of FC cast iron) and surface pressures taken into consideration, the thin metal plate 2 removes an amount of irregularity of the surface of a deck of the cylinder head, so that the sealing reliability can be improved. For example, there is a multi-cylinder engine in which a cylinder head and a cylinder block are formed out of an aluminum alloy and cast iron respectively, or a multi-cylinder engine in which both a cylinder head and a cylinder block are formed out of an aluminum alloy. When a concentrated surface pressure is applied to a surface of an aluminum material, impressions on and breakage of the material occur easily since the hardness thereof is low. When impressions occur on the surface of the aluminum material, the sealability of the material necessarily decreases when it is used for a long period of time. In an engine in which the cylinder head and cylinder block are formed out of an aluminum alloy and FC cast iron respectively, a metal gasket is preferably interposed therebetween so that the thin metal plate 2 and elastic metal plate 1 are positioned on the side of the cylinder head and on the side of the cylinder block respectively.

In this metal gasket, it is preferable to coat the surfaces of metal plates constituting the elastic metal plate 1 and thin metal plate 2 with a heat- and oil-resisting non-metallic layer of, for example, around 10–50 $\mu$m so as to avoid a metal-to-metal contacting condition of these plates with respect to the cylinder head and cylinder block and secure the corrosion resistance, durability and strength of the metal gasket.

Figure 3:
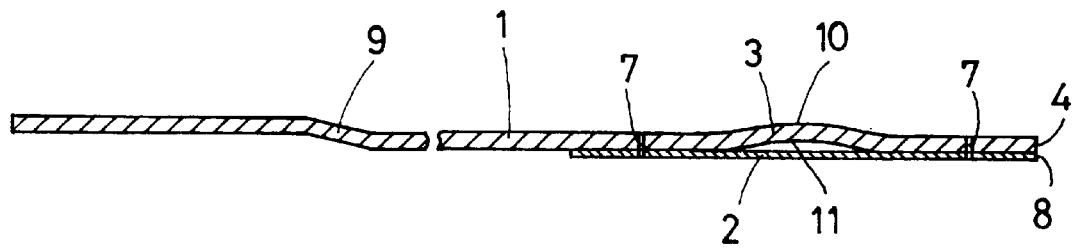
FIG. 3 is an enlarged sectional view showing the portion of second embodiment of the metal gasket according to the present invention which corresponds to what is shown in the above sectional view taken along the line A—A in FIG. 1.

A second embodiment of the metal gasket of the present invention will now be described with reference to FIG. 3.

The metal gasket of the second embodiment has the same construction and function as that of the first embodiment except that a structure in the former for fixing a thin metal plate 2 to an elastic metal plate 1 is different from that in the latter, the corresponding parts being therefore designated by the same reference numerals. In the second embodiment, the fixing of the thin metal plate 2 to the elastic metal plate 1 is done at joint portions 7 in a plurality of positions (four positions in the embodiment of FIG. 1) along the inner and outer circumferential sides of beads 3, which are formed so as to extend around combustion chamber holes 4, by spot welding or laser welding.

Figure 4:
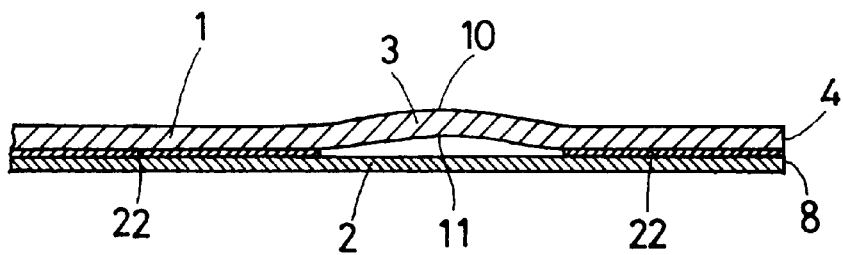
FIG. 4 is an enlarged sectional view showing the portion of a third embodiment of the metal gasket according to the present invention which corresponds to what is shown in the above sectional view taken along the line A—A in FIG. 1.

A third embodiment of the metal gasket according to the present invention will now be described with reference to FIG. 4.

In the third embodiment, a thin metal plate 2 is fixed to an elastic metal plate 1 by a bonding agent 22 instead of a welding method. The fixing of the thin metal plate 2 to the elastic metal plate 1 by the bonding agent 22 may be done with respect to the whole of the surfaces thereof, or with respect to parts of the surfaces thereof.

Figure 5:
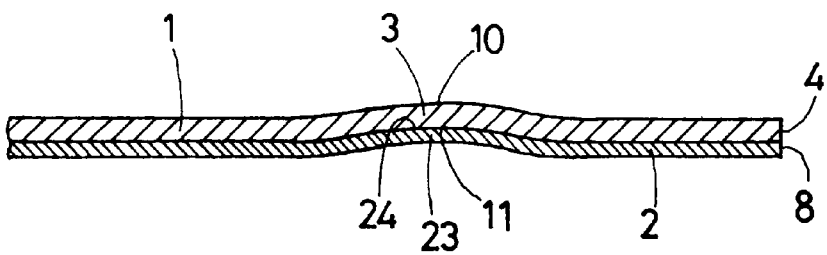
FIG. 5 is an enlarged sectional view showing the portion of a fourth embodiment of the metal gasket according to the present invention which corresponds to what is show in the above sectional view taken along the line A—A in FIG. 1.

A fourth embodiment of the metal gasket according to the present invention will now be described with reference to FIG. 5.

In the fourth embodiment, a thin metal plate 2 is provided with beads 23 having ridges 24 engageable with valley portions 11 of beads 3 of an elastic metal plate 1. The fixing of the thin metal plate 2 to the elastic metal plate 1 may be done by applying any of the structures employed in the first, second and third embodiments.

Figure 6:
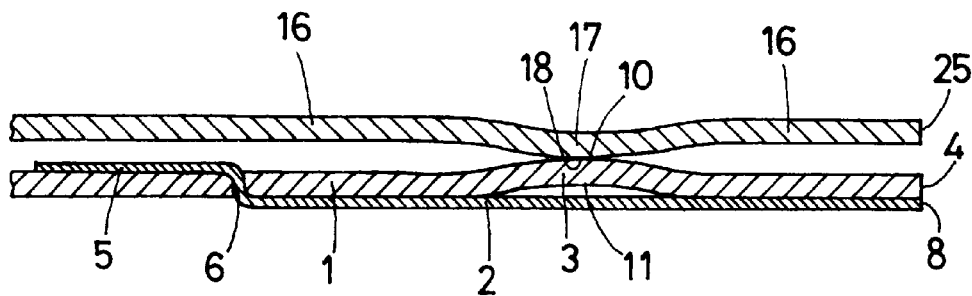
FIG. 6 is an enlarged sectional view showing the portion of a fifth embodiment of the metal gasket according to the present invention which corresponds to what is shown in the above sectional view taken along the line A—A in FIG. 1.

A fifth embodiment of the metal gasket according to the present invention will now be described with reference to FIG. 6.

In the fifth embodiment, another elastic metal plate 16 provided with beads 17 having ridges 18 which are engageable with ridges 10 of beads 3 of the same elastic metal plate 1 as these in the above embodiments is laminated on the elastic metal plate 1. The elastic metal plate 16 is provided with combustion chamber holes 25 formed correspondingly to those 4 of the elastic metal plate 1. In the fifth embodiment, the structure used in the first embodiment is shown as a structure for fixing a thin metal plate 2 to the elastic metal plate 1. Any of the structures employed in the second and third embodiments may also be applied to the fifth embodiment. As shown in the fourth embodiment, beads may be formed on the thin metal plate 2.

What is claimed is:

1. A metal gasket having a gasket thickness and comprising an elastic metal plate having beads along circumferences of parallel-arranged first combustion chamber holes, and a thin metal plate which has second combustion chamber holes opposed to said first combustion chamber holes, said thin metal plate extending in a predetermined width around said second combustion chamber holes so as to be opposed to valley portions of said beads, wherein said thin metal plate is thinner than said elastic metal plate, wherein said thin metal plate has outwardly projecting locking portions at an outer circumference thereof, said elastic metal plate having slits in first regions thereof which are on an outer side of said beads thereon, said thin metal plate being fixed to said elastic metal plate with said locking portions of said thin metal plate engaged with said slits of said elastic metal plate, wherein said projecting locking portions of said thin metal plate are bent onto the elastic metal plate so as to extend, along said metal plate, radially outwardly from one of the second combustion chamber holes respectively associated therewith, whereby the gasket thickness is kept generally to a sum of a thickness of said elastic metal plate and a thickness of said thin metal plate over areas where said locking portions lie on said elastic metal plate, and wherein said thin metal plate is joined partly to said elastic metal plate by one of spot welding and laser welding in second regions thereof which are on a side of said combustion chamber holes with respect to said beads of said elastic metal plate.

2. A metal gasket according to claim 1, wherein said thin metal plate is provided with beads having ridges aligned and engaged with said valley portions of said beads of said elastic metal plate.

3. A metal gasket according to claim 1, wherein the thin metal plate is laminated on said elastic metal plate and has a bead ridge engageable with the valley portion of one of said beads of said elastic metal plate.

4. A metal gasket according to claim 1, wherein said locking portions which extend radially outwardly are substantially straight.

* * * * *